Figure 1:
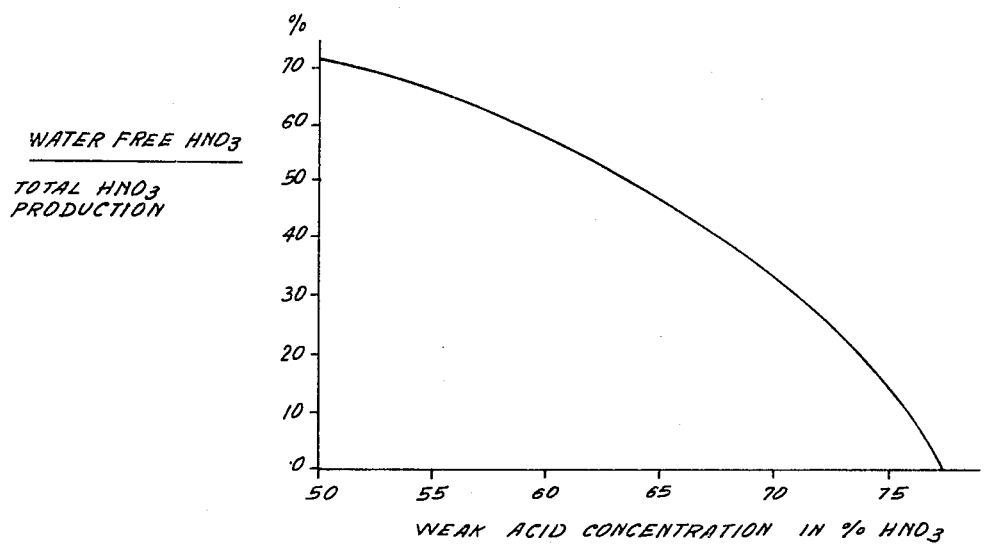

United States Patent

[11] 3,634,031

[72] Inventors Lars Hellmer;
Wolfgang Nolle, both of Berlin, Germany
[21] Appl. No. 849,023
[22] Filed Aug. 11, 1969
[45] Patented Jan. 11, 1972
[73] Assignee Pintsch Bamag Aktiengesellschaft, Berlin, Germany
[32] Priority Mar. 28, 1969
[33] Germany
[31] P 19 16 814.0

[54] PROCESS FOR THE PREPARATION OF NITRIC ACID OF DIFFERENT CONCENTRATIONS
9 Claims, 2 Drawing Figs.

[52] U.S. Cl. ............................................. 23/160, 23/161
[51] Int. Cl. ............................................. C01b 21/40
[50] Field of Search ............................................. 23/157, 160–161, 162

[56] References Cited
UNITED STATES PATENTS

| | | | |
|---|---|---|---|
| 1,948,968 | 2/1934 | Kramer et al. | 23/160 X |
| 1,989,267 | 1/1935 | Caro et al. | 23/160 |
| 3,070,425 | 12/1962 | Grossman | 23/160 X |
| 3,389,960 | 6/1968 | Miller | 23/160 |
| 3,421,854 | 1/1969 | Smith et al. | 23/157 X |

*Primary Examiner*—Oscar R. Vertiz
*Assistant Examiner*—G. O. Peters
*Attorney*—Michael S. Striker ABSTRACT: A process for the preparation of nitric acid of different concentrations, and preferably of a concentration below 75 percent (weak acid) and of about 98 percent (highly concentrated acid) comprising oxidizing catalytically ammonia and air under pressure to form nitrous gas, oxidizing the NO contained in the gas in a first oxidation step with subsequent chemical absorption of the oxidized NO into a nitric acid obtained in a preceding covering step, whereby a weak nitric acid is formed, and oxidizing the NO remaining in the nitrous gas in a second oxidation step completely to $NO_2$, removing the $NO_2$ from the gas by physical absorption into highly concentrated nitric acid, separating the $NO_2$ from the nitric acid, liquefying the $NO_2$ and oxidizing the liquefied $NO_2$ with aqueous nitric acid to obtain highly concentrated nitric acid.

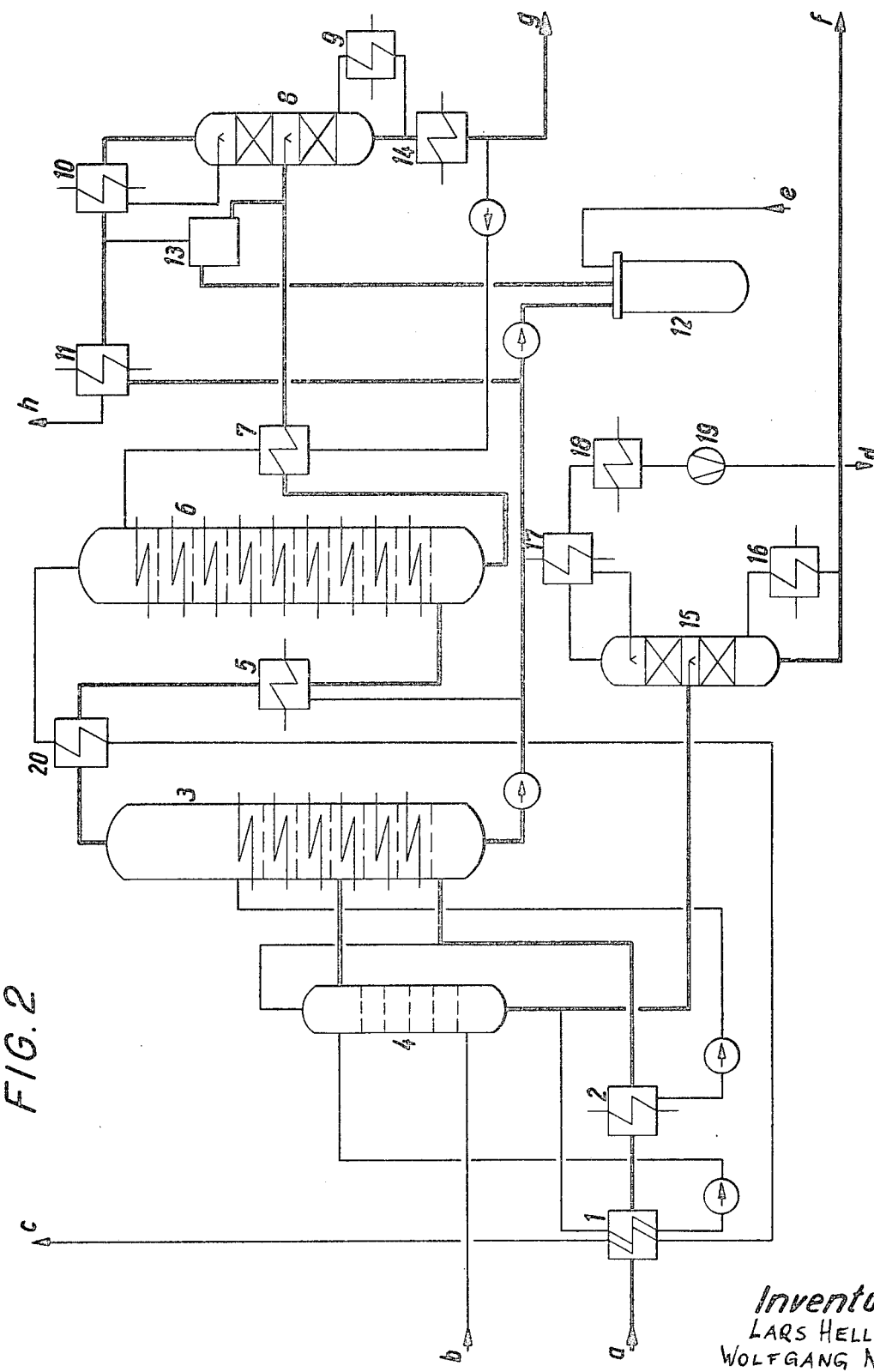

PROCESS FOR THE PREPARATION OF NITRIC ACID OF DIFFERENT CONCENTRATIONS

This invention relates to a process for the production of nitric acid of different concentrations, preferably of a concentration below 75 percent (weak acid) and of a concentration of about 98 percent (highly concentrated acid), from the gases formed in the oxidation of $NH_3$.

In a known process of this type, weak nitric acid is produced and a part of it is concentrated to form highly concentrated acid. It is necessary to remove in the concentration step the process water, which has been added to obtain the weak nitric acid. This is accomplished by addition of a concentration agent such as sulfuric acid or a solution of $Mg(NO_3)_2$. However, this concentration of the nitric acid and the reconcentration of the concentration agent are highly uneconomical.

In another known process of this type, highly concentrated nitric acid is produced in a so-called direct process, weak acid being removed during the process. However, this process requires a high expenditure of apparatus, because the $NH_3$ oxidation is carried out practically without pressure, as otherwise the water which is removed in order to maintain the water balance would contain too much nitric acid and the nitrogen yield would be too low. In addition, the removable amount of weak acid is limited by the water content of the reaction gas remaining in the oxidation section of the apparatus. Firstly, the amount of weak acid is limited to about 15 percent of the total production, and secondly the concentration of the weak acid is limited by the adjustment of the gas pressure in the oxidation part of the apparatus and amounts generally to 55 percent. An increase of the amount of the weak acid produced is only possible by additional apparatus expenditures, i.e., for an absorption device. However, an increase of the acid concentration is hardly possible as it is dependent on the existing pressure in the apparatus.

It is therefore one object of the invention to carry out a process for the preparation of nitric acids in a more efficient and economical manner than possible by the process of this type known hitherto.

Another object is to regulate the ratio of highly concentrated nitric acid to weak nitric acid.

A further object of the invention is to regulate the concentration of weak acid obtained.

These and still further objects will become apparent from the following description.

In accordance with the invention, it has been found that a process for the preparation of nitric acid of different concentrations, preferably of a concentration below 75 percent (called weak nitric acid) and of about 98 percent (called highly concentrated nitric acid) can be carried out in an efficient and economical manner, if $NH_3$ and air are reacted under the action of a catalyst and under a pressure of from about 2 to about 15 atm., and preferably at from about 4 to about 10 atm., to form nitrous gases, cooling the nitrous gasses to such an extent, that a large amount of reaction water condenses to form a nitric acid of a concentration of preferably from about 20 to about 45 percent, then in a first oxidation step oxidizing the NO contained in the nitrous gas to a degree which is necessary for the concentration of the weak nitric acid formed by the subsequent chemical absorption of the nitrous gas into the nitric acid, i.e., a concentration of preferably 20–45 percent obtained in the said cooling step, in a second oxidation step oxidizing the NO remaining in the nitrous gas after the chemical absorption step substantially completely to $NO_2$, washing the $NO_2$ thus formed out from the gas obtained after the second oxidation step with highly concentrated nitric acid by physical absorption, separating the absorbed $NO_2$ from the highly concentrated nitric acid, preferably by distillation, liquefying the thusly obtained $NO_2$ and oxidizing the liquefied $NO_2$ by addition of oxygen and water in the form of aqueous nitric acid to thereby form a highly concentrated nitric acid.

The present invention is based on the following considerations:

In the formation of nitric acid from $NH_3$ according to the total reaction equation
$NH_3+2O_2 \rightarrow HNO_3+H_2O$ from 17 kg. $NH_3$ and 64 kg. $O_2$ there are obtained, assuming dry air and dry end gas and a 100 percent conversion—63 kg. acid and 18 kg. $H_2O$. If no process water is introduced into the process, under the conditions mentioned, a weak acid of $63/(63+18)=77.7$ percent would be produced. These numbers have to be adjusted correspondingly if humid air, humid air gas and only low conversion have to be taken into consideration. If the process is conducted so that all of the reaction water according to the above-shown equation is used for the production of weak nitric acid, any suitable acid concentration below the value above indicated, in practical cases corresponding to a corrected value based on a concentration of 77.7 percent, can be obtained, whereby a corresponding amount of substantially water-free acid can be obtained. The total amount of water which has to be utilized and the concentration of the weak acid produced are the criteria for the ratio of weak acid obtained to substantially water-free nitric acid.

FIG. 1 of the drawing showing this dependency. In the chart (FIG. 1) as criteria for determining the amount of water, there have been assumed dry air, dry residual gas and 100 percent conversion of ammonia to acid and as highly concentrated acid water-free nitric acid was assumed.

If, according to the invention, a nitric acid condensate obtained by cooling down the nitrous gas formed by catalytic ammonia oxidation is used for the production of weak nitric acid, the requirement of the known so-called "direct process" to carry out at least the $NH_3$-oxidation and the condensation of the reaction water at atmospheric pressure, can be avoided as it is now not necessary to keep the acid concentration of the condensate as low as possible. This condensate contains, according to the above-mentioned equation, the reaction water which has to be removed if only water-free acid is desired. For this reason, the nitric acid contained in the condensate correspondingly decreased the total yield of the production plant.

The use of the condensate for the production of weak acid avoids this loss and simultaneously eliminates all water pollution problems connected with this problem. The independence of atmospheric pressure in the $NH_3$-oxidation part of the plant permits a selection of a pressure based on principles of economy.

The use of pressure in the catalytic oxidation of $NH_3$ provides the advantage of a remarkable decrease in the expenditure for apparatus. This is also true for the heat exchangers in which the hot gasses having a temperature of about 900° C. are cooled down, as the heat exchange of a gas under pressure is better comparison to a pressureless gas. In general, a pressure of from about 2 to about 15 atm. is applied, a range of from about 4 to about 10 atm. has proved particularly desirable for economical reasons.

In the oxidation of 1 mol, $NH_3$ 1.5 mols water are formed which is contained in the gas as steam. By cooling down to about 50° C., the biggest part of the water condenses and forms with the nitrous gas an acid having a concentration of about 35 percent. This condensate is separated from the gas stream. The cooling of the gas from about 100° C. down to about 50° C. preferably takes place by means of cooling water. By this rapid cooling only a weak concentrated acid having a minimum concentration of 20 percent and a maximum concentration of 45 percent is obtained. The weaker the acid is, the more preferably is it for the process of the invention.

The process of the invention can be regarded as a combination of the known process for the production of weak nitric acid and the known process for the production of highly concentrated nitric acid, starting from the $NO_2$-absorption. The chemical absorption, according to the process of the invention, however, is distinguished from the conventional process for the production of weak acid by the fact that as seen in the direction of the moving gas stream, the absorption of NO and/or $NO_2$ is interrupted at the point where the addition of the acid condensate is carried out. The nitrogen oxides still remaining in the gas are washed out in the step of the physical absorption.

The ratio of weak acid and highly concentrated acid shown in the chart of FIG. 1 can be varied in both directions. More weak acid is formed by addition of water, while more highly concentrated acid and less weak acid is formed in the water contained in the condensate is removed as far as possible.

The removal of water can be carried out in two ways. According to a first procedure, the weak acid is contacted with the inert gas (residual gas of the system) at temperatures above 40° C. By reason of the partial pressure ratios, substantially only water and no acid are evaporated. The residual inert gas which has been in contact with highly concentrated acid in an absorption column contains only a very little steam partial pressure (below 0.2 mm. Hg), and contacting this gas with weak acid serves to remove water from the acid. The amount of water removed from the acid increases with the temperature at a temperature of 40° C. The steam partial pressure in the gas phase above an acid concentration of 50 percent, is 25 mm. Hg, that means a gas amount of about 10,000 $m^3$ can absorb 260 kg. water, which is thereby removed from the process. If the weak acid has a concentration of 60 percent by these means, the amount of highly concentrated acid can be increased from 57 percent to 71 percent. The enrichment of the gas with water, i.e., steam can be carried out using a filler body layer or a tray distillation column. The heating to more than 40° C. can take place by heating the gas or the acid in which case the heating can be carried out by heat exchange with the reaction gases which are thereby cooled or by the use of low-pressure steam.

Another possibility for the removal of the water is the fractional distillation, either of the condensed weak acid or of the weak acid obtained in the chemical absorption step, by which the concentration can be increased up to 67 percent (azeotropic mixture).

The invention will be further illustrated by reference to the drawing in which:

FIG. 1 is a chart of data showing the relationship between the water-free $HNO_3$—total $HNO_3$ production to weak acid concentration in $HNO_3$; and FIG. 2 is a low diagram of a preferred mode of practicing the invention.

Referring now to the drawing and particularly to FIG. 2 wherein a process is set out in which a highly concentrated nitric acid of a concentration of 99 percent and a weak acid of a concentration of 60 percent are produced in a ratio of 1:1,2. At $a$ the gases of the $NH_3$-oxidation which have a pressure of 9.5 atm. are introduced. In apparatus 1, the reaction gas is cooled down and simultaneously the residual gas heated to about 70° C. During this heat exchange, the residual gas is contacted with weak acid, whereby the residual gas essentially is saturated with water steam. This process occurs in the tubes of the heat exchanger by acid dropping down, the acid concentrating thereby from 55 percent to about 57 percent. The reaction gas is further cooled in a condenser gas cooler 2, and together with the condensing water, an acid of about 35 percent is formed, which is removed. In the lower part of an oxidation-absorption column 3, the adjustment of the required oxidation degree takes place, the resulting heat being removed by passage through a condensing coil column provided with sieve plates.

In the middle part of column 3, by chemical absorption effected by passage through the sieve plates, an acid having a 55 percent concentration is formed, the condensate formed in 2 being used for this. In this part of the column, the nitrogen oxides necessary for the formation of weak acid are taken from the gas, that part of the nitrogen oxides remaining in the gas being subsequently used for the formation of highly concentrated acid. In a degasification column 4, the formed acid is freed from the nitrogen oxides contained in it by introduction of air derived from $b$. A part of the degassed acid is introduced into apparatus 1 in order to enrich the residual gas with steam.

In the upper part of column 3, the complete oxidation of the nitrogen oxide still present in the gas takes place. In a heat exchanger 20, the reaction gas is precooled by the cold residual gasses flowing out of the system. A gas cooler 5, containing cold brine provides a further cooling of the gas. Also here an acid condensate is formed which in the same way as the condensate formed in the oxidation part of column 3, is introduced into the autoclave 12 to form a highly concentrated acid. In column 6, the nitrogen oxides of the gas present as tetroxide are washed out with highly concentrated nitric acid by physical absorption. This occurs on sieve plates which are cooled by out-flowing brine. By aid of the cold brine, a temperature level at this absorption stage is adjusted which provides the desired nitrous content in the end gas. The gas leaving the column is substantially free from nitrogen oxides (less than 200 p.p.m.) and is preheated in apparatus 20 and 1. At $c$ it leaves the plant, is further heated and expanded in a gas turbine. After preheating in an apparatus 7, the highly concentrated acid containing tetroxide of column 6 is introduced into a decolorizing column 8 via a heater 9. The separated tetroxide is treated in a reflux condenser 10 and liquefied in a condenser 11. Together with weak acid from column 3, it is pressed into the autoclave 12. By addition of oxygen from $e$, the formation of highly concentrated nitric acid under a pressure of about 50 atm. takes place. The acid formed which contains still tetroxide in excess is predegassed in device 13 and passed into decolorizing column 8. On the bottom of this column, pure highly concentrated nitric acid is obtained, which is cooled in device 14 and partly removed at $g$, while another part is precooled in cooler 7 and introduced in column 6 as adsorbent.

The weak acid of column 4 having a concentration of 57 percent in column 15 (with heater 16) is fractionally distilled under vacuo in order to maintain relatively low temperatures in the column. For this reason, a vacuum pump 19 with ventilation at $d$ is provided. The separated water vapor is partly liquefied in reflux condenser 17 and completely condensed in device 18. On the bottom of column 15, a nitric acid having a concentration of about 60 percent is collected which flows out of the plant at $f$.

The following example is given for the purpose of illustrating the invention and is in no wise to be construed as a limitation thereof.

EXAMPLE

In the example which has been described with reference to the apparatus as described above and shown in the attached drawing, 500 metric tons per day of $HNO_3$ were obtained, 42 percent thereof in the form of 99 percent acid and 58 percent as 60 percent acid.

|  | Reaction gas [1] | Air at point b [2] | Reaction gas [3] |
|---|---|---|---|
| NO, $Nm.^3/hr$ | 2,246 |  | 1,444 |
| $NO_2/1/2N_2O_4$, $Nm.^3/hr$ | 5,242 |  | 4,331 |
| $O_2$, $Nm.^3/hr$ | 1,488 | 2,206 | 2,865 |
| $N_2$, $Nm.^3/hr$ | 51,825 | 7,678 | 59,503 |
| $H_2O$, $Nm.^3/hr$ | 12,874 | 164 | 1,043 |
| Total, $Nm.^3/hr$ | 73,675 | 10,048 | 69,186 |
| Temperature, ° C | 185 | 120 | 68 |
| Pressure, atm. abs | 9.5 | 9.6 | 9.3 |

|  | Reaction gas [4] | Tail gas after col. 6 before app. 20 | Tail gas at point c after app. 1 |
|---|---|---|---|
| NO, $Nm.^3/hr$ |  |  |  |
| $NO_2/1/2N_2O_4$, $Nm.^3/hr$ | 3,485 | 12 | 12 |
| $O_2$, $Nm.^3/hr$ | 1,570 | 1,570 | 1,570 |
| $N_2$, $Nm.^3/hr$ | 59,503 | 59,503 | 59,503 |
| $H_2O$, $Nm.^3/hr$ |  |  | 850 |
| $HNO_3$, $Nm.^3/hr$ |  |  | 69 |
| Total, $Nm.^3/hr$ | 64,558 | 61,085 | 62,004 |
| Temperature, ° C | −5 | 0 | 70 |
| Pressure, atm. abs | 8.8 | 8.4 | 8.2 |

|  | Degassed acid [5] | Weak acid product after col. 15 | Condensate [6] |
|---|---|---|---|
| $NO_2/1/2 N_2O_4$, kg./hr. |  |  |  |
| $HNO_3$, kg./hr. | 8,790 | 8,790 | 4,819 |
| $H_2O$, kg./hr. | 6,956 | 5,853 | 8,950 |
| Total, kg./hr. | 15,746 | 14,633 | 13,769 |
| Temperature, °C. | 55 |  | 40 |

|  | Acid-tetroxide [7] | Tetroxide Condensate [8] | Mixture [9] |
|---|---|---|---|
| $NO_2/1/2 N_2O_4$, kg./hr. | 7,132 | 11,347 | 4,215 |
| $HNO_3$, kg./hr. | 13,113 | 347 | 12,390 |
| $H_2O$, kg./hr. | 132 |  | 122 |
| Total, kg./hr. | 20,377 | 11,694 | 16,727 |
| Temperature, °C. | −3 | −5 | 85 |

|  | Highly concentrated acid— | |
|---|---|---|
|  | After app. 14 | As circulation acid after app. 7 before col. 6 |
| $NO_2/1/2 N_2O_4$, kg./hr. |  |  |
| $HNO_3$, kg./hr. | 12,043 | 13,113 |
| $H_2O$, kg./hr. | 122 | 132 |
| Total, kg./hr. | 12,165 | 13,245 |
| Temperature, °C. | 35 | 2 |

[1] At point a before apparatus 1.
[2] Before column 4.
[3] Before column 3 after apparatus 2 and 4.
[4] After app. 5 before col. 6.
[5] Behind col. 4 after flowing through apparatus 1 before col. 15.
[6] After apparatus 2 before col. 3.
[7] Mixture after col. 6 before apparatus 7.
[8] After apparatus 11 before pump.
[9] After autoclave 12 before apparatus 13.

We claim:

1. Process for the simultaneous preparation of nitric acid of different concentrations ranging from weak to highly concentrated, which comprises reacting $NH_3$ and air in the presence of a catalyst at a pressure of from about 2 to about 15 atm. to form nitrous gas, cooling the nitrous gas so that substantially all of the reaction water present therein is condensed and nitric acid having a concentration of about 20 to 45 percent is formed, oxidizing the NO contained in the nitrous gas in a first oxidation step to the extent required to produce the desired concentration of the weak nitric acid to be formed by chemical absorption of the thusly oxidized, nitrous gas with the nitric acid having a concentration of about 20 to 45 percent obtained in said cooling, contacting said oxidized nitrous gas with said nitric acid having a concentration of about 20 to 45 percent obtained in said cooling to produce weak nitric acid having a concentration of up to about 75 percent by chemical absorption, recovering said weak nitric acid, oxidizing the NO remaining in said nitrous gas following said chemical absorption step in a second oxidation step, scrubbing out the $NO_2$ thereby formed from the gas recovered from said second oxidation step with highly concentrated nitric acid by physical absorption, separating out the $NO_2$ from the highly concentrated nitric acid scrubbing agent, liquefying said separated $NO_2$, oxidizing said liquefied $NO_2$ by contacting the same with oxygen and water in the form of aqueous nitric acid under pressure to thereby form highly concentrated nitric acid and recovering said highly concentrated nitric acid.

2. Process according to claim 1 wherein the residual gas remaining after separation of said $NO_2$ is contacted with said weak nitric acid formed in the process, at a temperature in excess of 40° C.

3. Process according to claim 1 which comprises subjecting said weak acid to rectification.

4. Process according to claim 1 which comprises introducing additional water into said chemical absorption of said oxidized nitrous gas.

5. Process according to claim 1 which comprises utilizing at least a part of said weak nitric acid formed in the chemical absorption in the formation of said highly concentrated nitric acid.

6. Process according to claim 1 wherein at least a part of the nitric acid formed in said cooling step is used in the formation of said highly concentrated nitric acid.

7. Process according to claim 1 which comprises simultaneously preparing nitric acids of a concentration below 75 percent and of about 98 percent.

8. Process according to claim 1 which comprises conducting said process at a pressure of from about 4 to about 10 atm.

9. Process according to claim 1 which comprises separating the absorbed $NO_2$ from the highly concentrated nitric acid by distillation.

* * * * *